Jan. 10, 1961     H. E. BURGERT     2,967,428
DEVICE FOR TESTING THE EXTENT TO WHICH MEAT HAS BEEN COOKED
Filed Dec. 26, 1957     2 Sheets-Sheet 1

INVENTOR.
HAROLD E. BURGERT
BY
ATTORNEY

Jan. 10, 1961     H. E. BURGERT     2,967,428
DEVICE FOR TESTING THE EXTENT TO WHICH MEAT HAS BEEN COOKED
Filed Dec. 26, 1957     2 Sheets-Sheet 2

INVENTOR.
HAROLD E. BURGERT
BY
ATTORNEY

United States Patent Office 2,967,428
Patented Jan. 10, 1961

2,967,428

DEVICE FOR TESTING THE EXTENT TO WHICH MEAT HAS BEEN COOKED

Harold E. Burgert, 26 Castlebar Road, Rochester, N.Y., assignor of three percent to Irving Arem and Jane L. Arem, twenty-five percent to Charles De Martin, twenty-five percent to Edwin J. Smith, two and one-half percent to Clement J. Bocklage, eleven percent to Allan E. Kappelman, five percent to John W. Branch, two percent to Frederick Schleber, and one percent to Frank Beuckman, all of Monroe County, N.Y.

Filed Dec. 26, 1957, Ser. No. 705,164

2 Claims. (Cl. 73—352)

This invention relates to a device that may be used by chefs to indicate the degree to which meat has been cooked. The invention also relates to a method for preparing and serving meat so that it is cooked to a desired degree.

Cooking meat has always been an art rather than a science because heretofore there has been no exact means for determining the degree to which meat has been cooked, except by cutting into it. This is particularly true of steaks and other individual portions of meat that are ordinarily but an inch or two in thickness. Ordinary roast thermometers are not satisfactory for use with small portions of meat, because they depend upon bimetallic elements to actuate the thermometer. Thermometers of this type have a slow response and are not sufficiently fast or accurate for cuts of meat of smaller size.

One object of the present invention is to provide a testing device for indicating the degree to which meat has been cooked, that is characterized by accuracy and great speed of response.

Another object of the invention is to provide a testing device for determining the degree to which meat has been cooked, that is of rugged construction, and that can be cleaned easily.

Still another object of the invention is to provide a light-weight device for testing the degree to which meat has been cooked, that is direct reading, and that is very simple to operate.

A further object of the invention is to provide a device of the character described that can be adjusted so that it will determine the degree to which the meat has been cooked substantially at the center of thickness of the meat.

Another object of the invention is to provide a device of the character described that will determine meat temperatures accurately and that will have a very low heat capacity itself, so that the device will effect a minimum change in the heat content of the heat whose temperature is being measured.

A related object of the invention is to provide a device for testing instantaneously and accurately the degree to which steaks have been cooked, and without interfering with the cooking of the steaks.

A further object of the invention is to provide a device of the character described that can be used for small and large portions of meat with equally accurate results.

Yet another object of the invention is to provide the method of preparing meat that will enable a selection to be made of a particular degree to which the meat should be cooked, and that will permit cooking the meat to exactly the selected degree.

A specific embodiment of the testing device is illustrated in the drawings. In this illustrated embodiment, the device consists of a cylindrical body that provides a convenient means for grasping the device. At one end of the body, a probe is mounted to project axially outward from the body. A thermistor is mounted at the tip of the probe, and is adapted to be inserted in the meat to determine its temperature. A sleeve is adjustably secured on the body about the probe, for axial movement relative to the probe to control the length of probe that can be inserted in the meat.

The thermistor is connected in one branch of an electrical bridge circuit that includes a galvanometer. The galvanometer is mounted at the opposite end of the body from the probe, and has a scale that is calibrated to indicate the degree to which the meat has been cooked. A source of constant D.C. potential is mounted in the body of the device, and is connected through a normally open switch to the bridge circuit.

The sleeve is adjusted on the body to expose a desired length of probe for insertion in the meat to approximately the center of the meat. While the meat is cooking, its internal temperature, and the degree to which it has been cooked, can easily be determined with this device by plunging the probe into the meat, so that the thermistor comes to rest at the approximate center of thickness of the meat. The switch is then closed to close the bridge circuit. Since the thermal response of the thermistor is substantially instantaneous, the galvanometer is deflected to indicate at once the precise degree to which the meat has been cooked.

To use the device to best advantage, commercially, cards can be provided that have pictures thereon indicating cuts of meat, such as steak, for example, that are cooked to different degrees. The pictures assist the diner and/or the chef in the selection of the degree to which the meat should be cooked; and the testing device insures that the cooking will produce meat that is cooked exactly to the desired degree.

The invention can best be understood from the following detailed description of a specific embodiment thereof, considered in connection with the drawings.

Figures 1, 2:
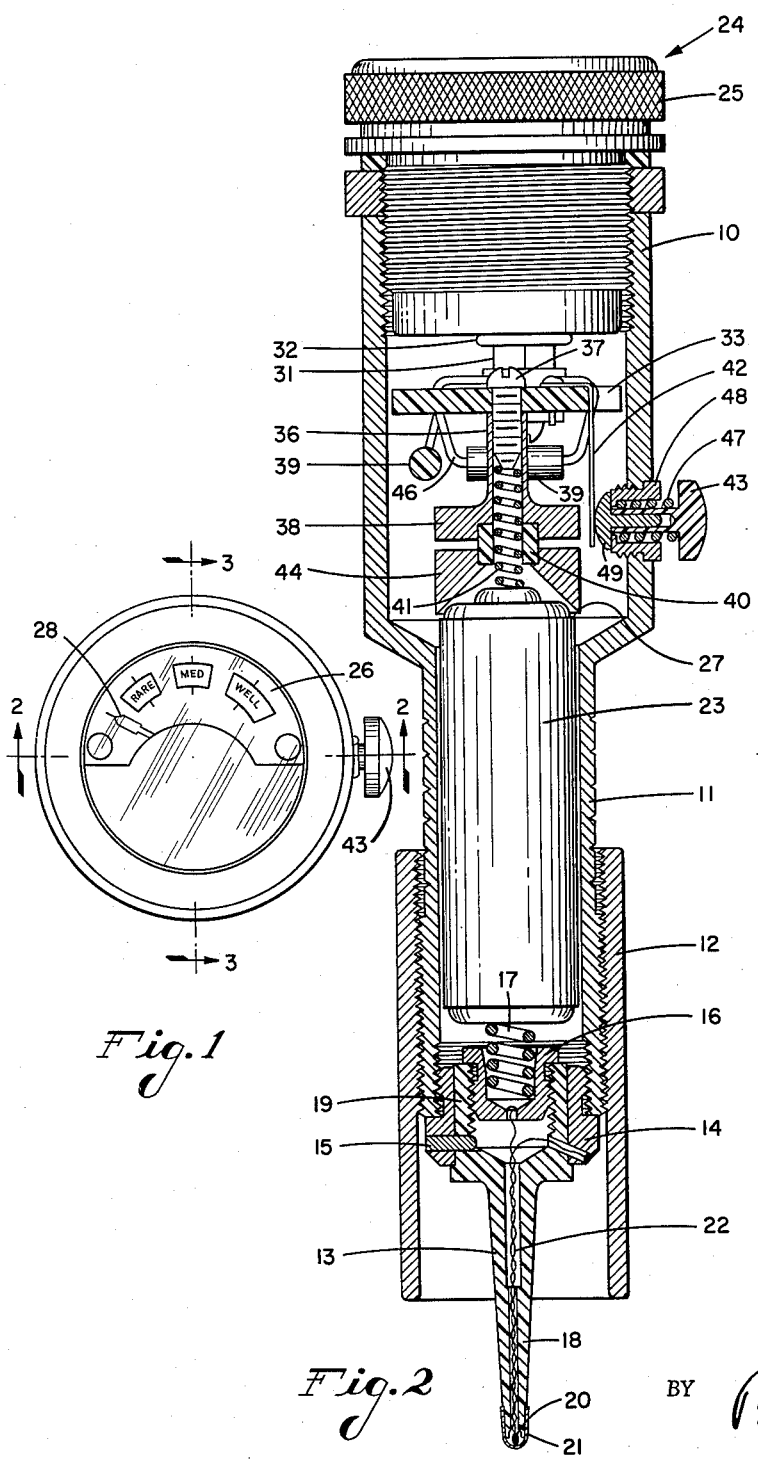
Fig. 1 is a top plan view of a testing device that is constructed according to one embodiment of this invention.
Fig. 2 is a section thereof, taken on the line 2—2 of Fig. 1, looking in the direction of the arrows.

Referring now in detail to the drawings, the testing device comprises a generally cylindrical tubular body 10 that has a reduced lower end 11 that is threaded both internally and externally adjacent its lower end. A cylindrical sleeve 12 is threaded on the lower end 11 of the body 10 for axial movement relative to the body. A nut 14 is screwed into the lower end of the reduced extension 11. A probe 13 is rigidly secured to the nut 14 by a pin 15, in axial alignment with the body 10 and its reduced extension 11. The probe 13 comprises a neck portion 19, that is of enlarged diameter and that is internally threaded, and an elongate conical projecting portion 18. The two portions are integral with one another and are made of nylon, or a similar plastic.

The probe 13 has a hollow bore; and a thermistor 20 is mounted in this bore, at the tip of the probe, with at least a portion of the thermistor projecting beyond the tip of the tapered portion 18 of the probe. The thermistor is held in place at the tip of the probe by a thermosetting resin. To protect the thermistor, without affecting its thermal response, a copper plated cap 21 is secured over the exposed portion of the thermistor and over the end of the conical member 18.

A generally cup-shaped hollow, brass plug 16 is screwed into thet upper end 19 of the probe; and a metallic coil spring 17 is mounted in the bore of the plug 16, to contact the inside wall of the plug 16 and to extend axially upward into the bore of the reduced extension 11. The plug 16 is electrically insulated from the nut 14 by the intervening conical plastic portion of the probe.

The thermistor terminals are electrically connected through a pair of lead wires 22 to the plug 16 and nut 14, respectively. The nut 14 is made of a conducting metal and makes electrical contact through its threads with the reduced extension 11 of the body 10.

A dry cell battery 23 is disposed in the bore of the reduced extension 11, with its base engaged against the spring 17, so that one terminal of the thermistor is in electrical contact with the positive terminal of the dry cell, through one lead wire 22. The dry cell 23 is a conventional type of primary battery and is enclosed within a cylindrical jacket 27 of paper or other electrically insulating material. The base of the dry cell is exposed for contact with the spring 17, but the side wall is covered with the paper jacket and is thereby electrically insulated from the reduced extension 11 of the body 10.

Figure 3:
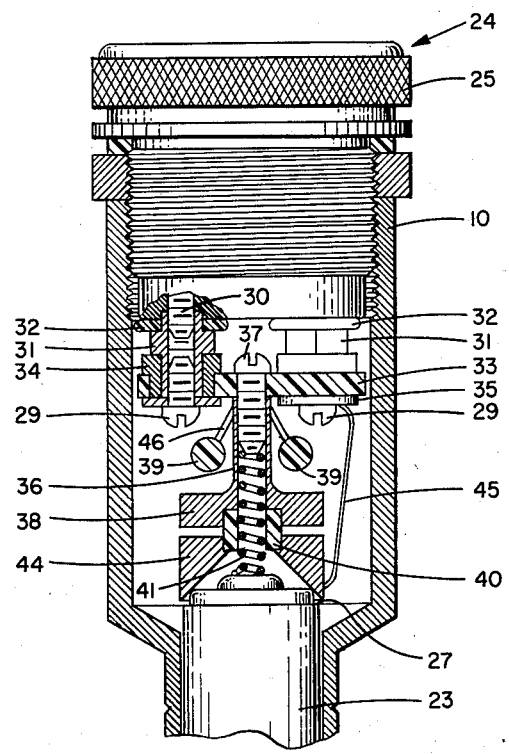
Fig. 3 is a section on the line 3—3 of Fig. 1, looking in the direction of the arrows.

A galvanometer 24, that is mounted in a case 25 that has the form of a plug, is screwed into the upper end of the body 10. As shown in Fig. 1, the galvanometer scale 26 is calibrated to indicate the degree to which the meat has been cooked. The pointer 28 of the galvanometer reads against this scale. While the galvanometer scale is preferably graduated with terms denoting the "doneness" of the meat, such as "Rare," "Med." "Well," indicating, respectively, that the meat is cooked rare, medium, or well-done, temperature calibrations can also be used. The metallic case 25 encloses completely the delicate working parts of the galvanometer. A pair of electrical terminal posts 30 (Fig. 3) project below the lower surface of the case 25. The posts 30 are connected by unions 31 with terminal screws 29. A rubber gasket 32 insulates each union from the case 25.

The terminal screws 29 together with the washers 35 serve to secure a rigid phenolic or other plastic insulating disc 33 to the posts 30. There is a collar 34 around each union 31. Each collar has a reduced portion fitting in a bore of disc 33 to center the disc 33 properly.

A metallic, electrically conductive tubular stem 36 is secured to the disc 33 by a screw 37. The stem 36 projects downwardly, coaxially with the disc 33 and with the body 10. The stem 36 is formed with an enlarged head or flange 38 at its lower end. An insulating washer 40 is seated and frictionally held in a counterbore in the head or flange 38. This insulating washer is also seated and frictionally held in a metallic contact collar 44 which fits over the upper end of the battery 23 and has electrical conducting contact therewith. A coil spring 41 is engaged in the stem 36 and projects through the insulating washer 40, axially downward for contact with the negative terminal of the dry cell 23, to establish electrical contact from the negative terminal, through the spring 41, with the stem 36 and its flange 38.

A plurality of electrical resistors 39 are suspended within the body 10, below the insulating disc 33. The resistors 39 are electrically connected in the manner shown in Fig. 4, and their wire leads 46 are passed through apertures in the disc 33 and are bent angularly to lie along the upper surface of the disc 33, to suspend the resistors below the disc 33.

Figure 4:
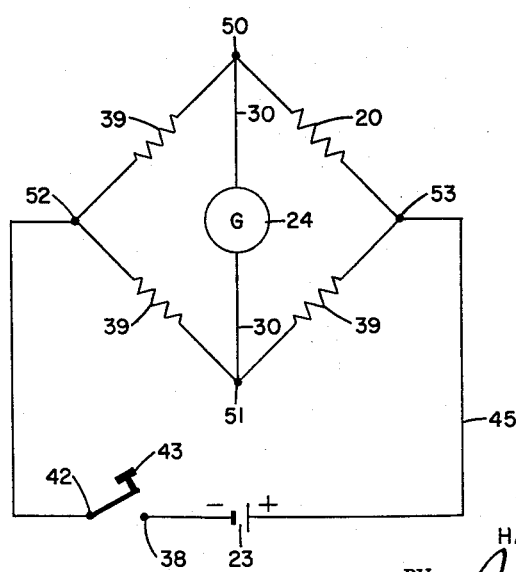
Fig. 4 is a schematic electrical diagram that shows one way in which the testing device may be wired to accomplish its purpose.

A conducting leaf spring 42 (Fig. 2) is mounted to depend downwardly from the disc 33 with its lower end normally slightly spaced from the flange 38. At its upper end, the spring 42 is electrically connected between certain of the resistors 39, as indicated in Fig. 4. A push button 43 is mounted for reciprocation through an aperture in the wall of the body 10 to engage the lower end of the spring 42, to move the spring 42 into and out of electrical contact with the flange 38. The button 43 is normally spring-pressed outwardly by a coil spring 47 which surrounds the stem of the button and which is interposed between the nipple 48 and the head of the button. Nipple 48 is threaded into casing or body 10. A headed pin 49, which has a pressed fit in the stem of the button, actually contacts leaf spring 42. An electrical connecting wire 45 is secured at its lower end to the contact collar 44, and passes through the disc 33 and is soldered to the lead wire 46 of one of the resistors.

One way in which the device may be wired to accomplish its purpose is indicated schematically in Fig. 4. The bridge circuit includes three resistors 39 of fixed electrical resistance values and the thermistor 20. One resistor 39 and the thermistor 20 are connected at a junction 50 to form one branch of the bridge circuit, and the other two resistors 39 are connected at a junction 51 to form the other branch. The galvanometer 24 is bridged across the two branches of the circuit, between the junction 50 and the junction 51.

Two of the resistors are connected at a junction 52, and the thermistor 20 and the other resistor 39 are connected at a junction 53.

The leaf spring 42 is electrically connected to the junction 52. The flange 38, symbolically indicated in Fig. 4, is mounted to be placed in electrical contact with the spring 42 by movement of the push button 43. The flange 38 is electrically connected with the negative terminal of the cell 23. This electrical connection is established from the negative terminal of the battery, through the spring 41, and the stem 36.

The positive terminal of the battery 23 is electrically connected with the junction 53 between the thermistor 20 and a resistor 39. This electrical connection is established through the contact member 44, and the lead wire 45.

One of the lead wires 22 from the thermistor 20 is connected with the positive terminal of the dry battery 23 through the plug 16 and its contact spring 17. The other lead wire 22 is connected through the nut 14, the reduced extension 11, the body 10, and the metallic body of the galvanometer 24, to one terminal post 30 of the galvanometer.

In the preferred method of using the device, the tester is used in conjunction with cards that are illustrated in color. Thus, the card can have six colored illustrations of a steak cooked to different degrees, that can be designated, for example, as extra rare, rare, medium rare, medium, medium well, and well done. This photographic presentation enables the consumer to select a steak that is cooked to his precise preference. Once the selection is made, the steak can be cooked.

Periodically during the cooking of the steak, the probe 13 is plunged into the steak to position the thermistor 20 at the approximate center of the thickness of the steak. To facilitate proper positioning of the thermistor 20, the sleeve 12 is adjusted axially of the reduced extension 11 to expose only that portion of the probe 13 that is approximately equal to one-half of the thickness of the steak. When this adjustment has been made, the lower surface of the sleeve 12 will engage against the surface of the steak when the probe is plunged into the steak, and automatically will position the thermistor 20 at the proper depth in the steak.

Thermistors have a very rapid thermal response. Their property is that their resistance changes with change in temperature. The temperature at the center of a steak provides an accurate indication of the degree to which the steak has been cooked. After the thermistor 20 has been lodged in the steak for a second or two, the push button 43 is depressed. The push button forces the leaf contact spring 42 against the flange 38, and closes the bridge circuit indicated in Fig. 4. After the thermistor has been in the steak a second or two, its temperature is that of the steak, and its resistance changes to correspond to its temperature. As the resistance of the thermistor changes, the position of the pointer 28 of the galvanometer 24 changes. The scale 26 of the galvanometer is calibrated to indicate the degree to which the steak has been cooked. Thus, within a second or two after the probe is plunged into the steak, an accurate indication of the degree to which the steak has been cooked can be obtained by observing the position of the pointer 28 on the scale 26.

While the structure of the device can be changed, the conical probe member 18 should be made of an inert material that is unaffected by the atmosphere or by contact with meats, that is electrically insulating, and that has low thermal conductivity, and that can be cleaned easily. Molded nylon possesses these characteristics and can be formed with sufficient rigidity so that it can be used repeatedly for insertion in meat. The protective cover 21 for the thermistor can be copper plated over a thin base plate of silver, if desired. The sleeve 12 and the body 10 of the testing device can be formed of a lightweight, inert metal, such as aluminum. The galvanometer may be a milliammeter of the galvanometer type. The resistances and the thermistor are selected to operate the galvanometer over the desired range.

The insulating disc 33 is preferably a molded phenolic laminate, but any rigid, readily worked insulating sheet material can be employed.

In the preferred embodiment of the invention, the electrical bridge circuit is formed from readily available resistors and other components. As will be appreciated, however, printed circuit elements might also be used.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. A unitary testing device for indicating the extent to which meat has been cooked, comprising a body providing means for grasping and holding said device with one hand, an elongate probe mounted on said body at one end thereof and projecting beyond said one end to be plunged into meat, said probe being made of an electrical insulating material of low thermal conductivity, a temperature sensitive electric resistance element whose resistance changes with change in its temperature mounted in the tip of said probe, a first electrical contact mounted in said probe adjacent the base of the probe, said body being adapted to hold a battery in position so that one pole thereof electrically engages said first contact, conducting means electrically connecting said resistance element in series with said first contact and said body, a plug removably attached to the other end of the body, a second electrical contact mounted on said plug, an electrically operated gauge mounted on said plug, said gauge being calibrated to indicate the extent to which the meat has been cooked, circuit means mounted on said plug and operatively connected electrically to said gauge and said second electrical contact, said circuit means and said second contact being removable with said plug, said second contact engaging the other pole of said battery when said plug is secured in said body, said plug when attached to the body electrically connecting with said body to complete a circuit to said gauge to cause said gauge to indicate the temperature value detected by said resistance element, a cylindrical sleeve adjustably secured to said body around said probe for adjustment axially of said probe, and means for maintaining said sleeve in any adjusted position to control the extent to which said probe can be plunged into the meat.

2. A unitary testing device for indicating the extent to which meat has been cooked comprising a tubular body which can be grasped and held in one hand, an elongate probe mounted on said body at one end thereof and projecting beyond said one end to be plunged into the meat, said probe being made of an electrical insulating material of low thermal conductivity, a thermistor mounted in the tip of said probe, a first electrical contact mounted in said probe adjacent said one end for connection to a pole of a battery, conducting means electrically connecting said thermistor in series with said first contact and said body, a plug removably attached to the other end of said body, a galvanometer mounted in said plug and having a dial calibrated to indicate the extent to which the meat has been cooked, a plurality of resistors attached to said plug, a second electrical contact mounted on said plug for connection to another pole of a battery, conducting means mounted on said plug to electrically connect said resistors to form a portion of a bridge circuit and to operatively connect said galvanometer across said bridge circuit and to operatively connect said bridge circuit electrically with said second electrical contact, said thermistor being operatively connected electrically in said bridge circuit through said body and plug and said first and second contacts when a battery is positioned in said body and when said plug is attached to said body, a manually-operable normally-open switch mounted on said body and connected electrically across said bridge circuit and being operative when closed to cause said galvanometer to register in accordance with the temperature of said thermistor, a sleeve adjustably secured to said body around said probe for adjustment axially of said probe, and means for maintaining said sleeve in any adjusted position to control the extent to which said probe can be plunged into the meat.

References Cited in the file of this patent

UNITED STATES PATENTS

| | | |
|---|---|---|
| 1,685,846 | Heslewood | Oct. 2, 1928 |
| 2,657,580 | Schroeder | Nov. 3, 1953 |
| 2,753,714 | Perkins et al. | July 10, 1956 |

FOREIGN PATENTS

| | | |
|---|---|---|
| 560,829 | Germany | Oct. 7, 1932 |

OTHER REFERENCES

Krog: "Thermistor Hypodermic Needle for Subcutaneous Temperature Measurement," Rev. of Scientific Instruments, vol 27, #6, June 1956, pp. 408, 409.